United States Patent [19]

Newsom

[11] Patent Number: 5,238,577
[45] Date of Patent: Aug. 24, 1993

[54] METHOD AND DEVICE FOR MAGNETICALLY REMOVING CHARGED PARTICLES FROM A BODY OF LIQUID

[76] Inventor: Roy R. Newsom, 4386 Copeland Ave., #6, San Diego, Calif. 92105

[21] Appl. No.: 902,573

[22] Filed: Jun. 22, 1992

[51] Int. Cl.$^5$ ............................................. C02F 1/48
[52] U.S. Cl. ...................................... 210/695; 210/222
[58] Field of Search .............. 210/222, 695; 204/155, 204/302; 55/3, 100

[56] References Cited

U.S. PATENT DOCUMENTS

| | | | |
|---|---|---|---|
| 1,546,632 | 7/1925 | Dow et al. | 55/100 |
| 3,274,095 | 9/1966 | Meyers | 204/301 |
| 3,658,674 | 4/1972 | Benak | 204/180 R |
| 3,764,499 | 10/1973 | Katsuhiro et al. | 204/151 |
| 3,929,433 | 12/1975 | Lucero | 204/155 |
| 4,601,808 | 7/1986 | Eumann et al. | 204/260 |
| 4,964,970 | 10/1990 | O'Hare | 204/301 |
| 5,128,043 | 7/1992 | Wildermuth | 210/695 |

FOREIGN PATENT DOCUMENTS 3031673  4/1982  Fed. Rep. of Germany ...... 210/695

Primary Examiner—Matthew O. Savage
Attorney, Agent, or Firm—Thomas J. Tighe

[57] ABSTRACT

A body of liquid containing charged particles is caused to flow in a stream. High level turbulence in the stream is preferably removed by a baffle in the path of the stream. The stream is then subjected to a magnetic field rotating normal to the general flux of the stream that is of sufficient strength to cause a substantial portion of the charged particles in the stream to move in respective convoluted paths generally centered around the axis of the field's rotation. Immediately downstream from the rotating magnetic field is a second magnetic field having lines of force generally parallel to the general flux of the stream. The second magnetic field is of sufficient strength to cause the rotating charged particles to move in a spiral motion toward the flux axis of the stream. The length of this second magnetic field is sufficient, in light of the flow rate of the liquid, to allow a substantial portion of the spiraling charged particles to enter a sub-stream at the core of the stream. An outlet also at the core of the stream drains or otherwise removes the sub-stream from the stream.

15 Claims, 2 Drawing Sheets

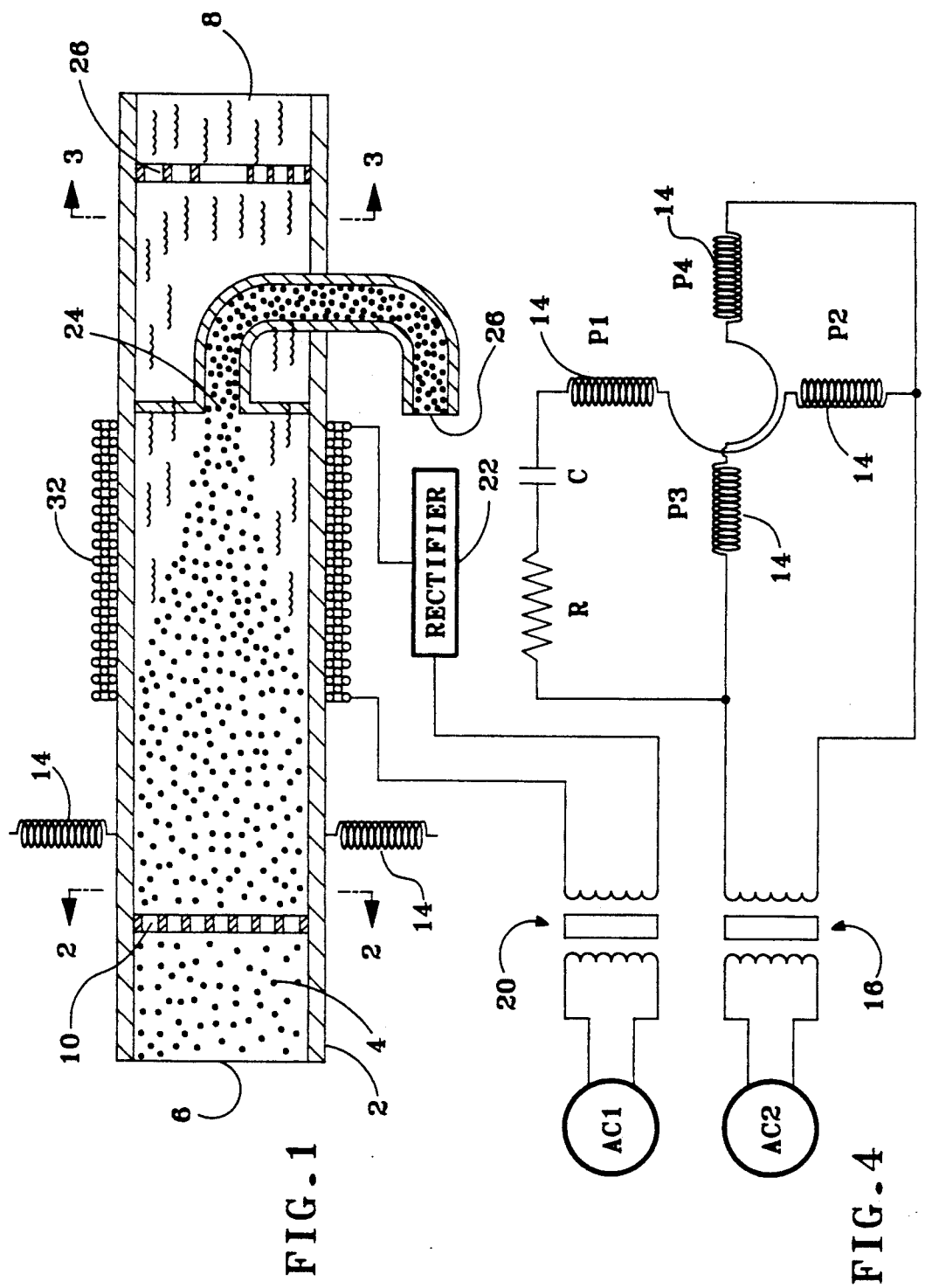

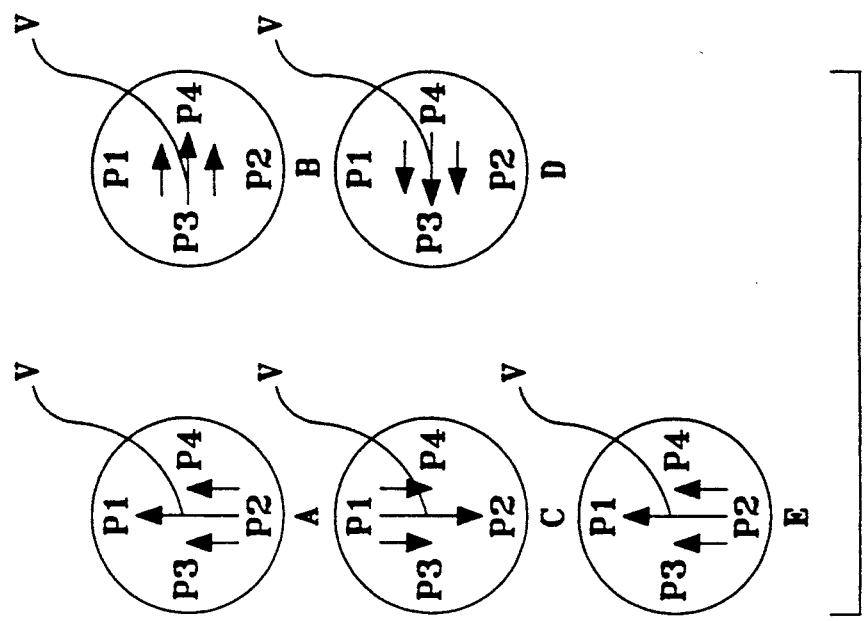
FIG.-6
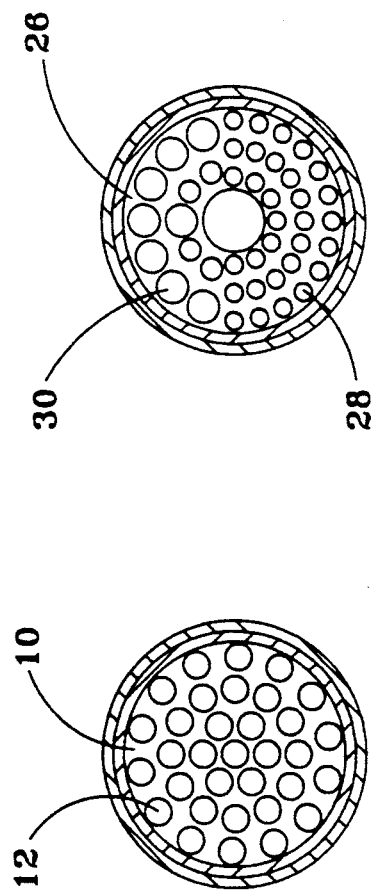
FIG.-3
FIG.-2
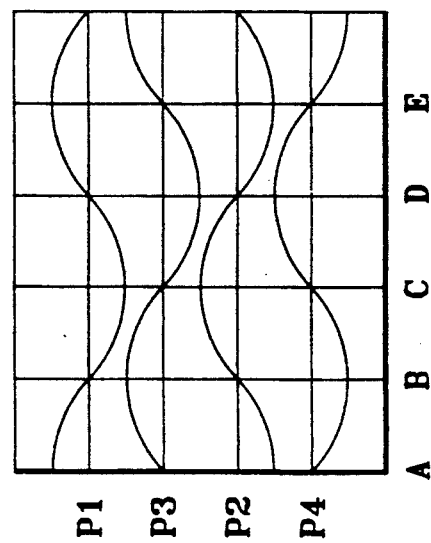
FIG.-5

METHOD AND DEVICE FOR MAGNETICALLY REMOVING CHARGED PARTICLES FROM A BODY OF LIQUID

BACKGROUND OF THE INVENTION

This invention relates in general to devices and methods for desalinizing water that take advantage of the fact that sodium chloride dissolved in water separates into anions and cations, and in particular to devices and methods, if any, that employ rotating and focusing magnetic fields.

In many areas of the world, population growth, weather conditions, or both create a need for a method of extracting fresh water from salt water. Although methods exist for such extraction, they are costly and inefficient. This invention discloses a method that is both cheaper and more efficient than those methods already employed.

The main impurity that must be removed from salt water to make it fresh is sodium chloride. Sodium chloride dissolved in water is known to separate into ion forms of its constituent atoms, sodium and chlorine, the sodium atom retaining a net positive charge (an anion) and the chlorine atom retaining a net negative charge (a cation). Because of these electric charges, there are conventional methods for desalinating water that employ an electrical potential to attract the ions to a place where they can be separated from the water.

For example, Meyers U.S. Pat. No. 3,274,095 presents a means for transferring ions using an anode and cathode, both in separate solutions with a cation exchange mat therebetween. It requires a two step process to convert salt water to pure water.

One disadvantage of the methods and apparatuses above is that each produces at least two types of waste as well as pure water. Another disadvantage is that the energy required to separate the salt from the water is relatively high. Further disadvantages exist in that some of the methods and apparatuses require periodic replacement of the elements used to extract the salt, while the others utilize components, such as ion exchange beads and membranes, that are too complicated, expensive, and impractical for large scale applications.

Other advantages and attributes are disclosed expressly or implicitly in the text hereinafter.

SUMMARY OF THE INVENTION

An object of the present invention is to provide a means for removing free moving charged particles from a liquid, such as water, without the need for filters, membranes and exchange beads, and without the need to convert the liquid to a gaseous form.

A further object of the present invention is to provide a means for removing dissolved salts, such as sodium chloride, and other contaminants that are also present in the form of free moving ions or other charged particles, from water such as seawater without the need for filters, membranes and exchange beads, and without the need to convert the water to a gaseous form.

A further object of the present invention is to provide a means for removing sodium chloride from water, such as seawater, in order to render the water suitable for human consumption.

These and other objects are achieved by a device for removing ions from a body of water comprising means for causing the water to flow in a stream, means for focusing a substantial portion of the charged particles in the stream into a sub-stream, and means immediately downstream from the focusing means for removing the sub-stream from the stream. The charged particle focusing means can comprise: (a) means for collimating the stream, (b) means for permeating a first length of the collimated stream with a first magnetic field that rotates normal to a general flux of the collimated stream, the axis of rotation being generally the collimation axis of the stream, the first magnetic field being of sufficient strength to cause a substantial portion of the charged particles in the collimated stream to move in respective convoluted paths generally centered around said axis of rotation, and (c) means for permeating a second length of the collimated stream immediately following the first length with a second magnetic field having lines of force generally parallel to the general flux of the collimated stream, the second magnetic field being of sufficient strength to cause the convoluting charged particles to move in a spiral motion toward said collimation axis of the stream, the second length being sufficient to allow a substantial portion of the spiralling charged particles to enter a sub-stream at the core of the collimated stream before reaching the end of the second length, the means for removing the sub-stream from the stream being disposed at the end of the second length.

BRIEF DESCRIPTION OF THE DRAWINGS

FIG. 1 is a cross-sectional view taken lengthwise along the axis of a conduit embodiment of this invention.

FIG. 2 is a cross-sectional view taken along line 2—2 of FIG. 1.

FIG. 3 is a cross-sectional view taken along line 3—3 of FIG. 1.

FIG. 4 is a schematical representation of the circuit and physical distribution of the electromagnetic poles of a rotating magnetic field generator.

FIG. 5 is a graph illustrating the relationships between phases of pole energization according to this invention.

FIG. 6 is a series of vector diagrams illustrating a rotating magnetic field vector according to this invention.

DESCRIPTION OF THE PREFERRED EMBODIMENT

This invention takes advantage of the forces exerted on charged particles moving through a magnetic field. It is well known that the motion of a charged particle moving through a magnetic field is effected by the field. The field exerts force on the particle tending to alter the particle's direction of movement. Change to the particle's path is minimal if the direction of the particle when entering the field is parallel to the magnetic field's lines of force, whereas maximum change in the particle's direction of movement occurs when the particle's direction of travel when entering the field is perpendicular to the field's lines of force. It is also well known that salts such as sodium chloride (NaCl) separate into free moving ionized particles when dissolved in water. Sodium chloride separates into a positively charged sodium ion and a negatively charged chlorine ion. While the discussion below will primarily be focused on the removal of sodium chloride from water, it should be noted that this invention can also be used to remove other substances that are dissolved in water or other liquids in the form of positively or negatively charged particles.

Referring to FIG. 1, the system is illustrated to have a length a section of cylindrical conduit 2 in which the separation of charged particles from water 4 takes place. Preferably the conduit is circular in cross-section. A stream of unprocessed water enters the conduit via an inlet 6 and exits the conduit via an outlet 8. The stream of unprocessed water is drawn from a body of water (not shown) by conventional means, such as a pump, and the processed water from the outlet 8 goes to a reservoir or is otherwise used. Since the stream of water entering inlet 6 will typically come from a pump which injects turbulence in the stream of water, the turbulence is significantly reduced or entirely eliminated by an inlet baffle plate 10. It is important to remove the turbulence because high level turbulence in the stream of water flowing through the conduit 2 can adversely effect the manipulation of the movement of charged particles in the water as described herein. The inlet baffle plate is disposed in the conduit proximate the inlet.

As illustrated in FIG. 2 the inlet baffle plate 8 is a disc equal in diameter to the inner diameter of the conduit and is in a plane normal to the conduit. The disc defines a plurality of holes 12 thorough which the water passes. The inlet baffle collimates the stream and constricts the flow of water to flux lines generally parallel to the conduit. Any significant turbulence in the stream of water is thereby eliminated. The number and size of the holes in the disc are adapted to minimize impedance to water flow.

Referring again to FIGS. 1 and 4, downstream from the inlet baffle the stream is permeated by a rotating magnetic field produced by a polyphase alternating electric current through a plurality of electromagnetic poles 14 radially oriented with respect to, and uniformly distributed around, the longitudinal axis of the conduit in a plane normal to said axis. The windings of the poles are in a circuit that is energized by the secondary of a transformer generally designated 16. The primary of the transformer is energized by a first single-phase alternating current AC2.

As illustrated, there are four electromagnetic poles, P1, P2, P3, and P4, physically distributed around the conduit 90° apart. A first series circuit comprising a pair of oppositely disposed, serially connected poles, P3 and P4, is connected in parallel to the secondary of the transformer 16 and the current through this series circuit lags the secondary voltage by approximately 90°. Also connected in parallel with the secondary is a second series circuit comprising a second pair of oppositely disposed, serially connected poles, P1 and P2, and a phase-shifting circuit comprising a resistor R and a capacitor C. The resister R is of such magnitude that currents through the first and second series circuits are 90° out of phase. Each pole taken in sequence around the conduit receives current progressively shifted in phase from the phase of an immediately preceding pole, the phase shifts being uniformly 90°. In this way the single-phase alternating energy originating at the secondary of the transformer 16 provides polyphase energization to the poles, energization that is distributed to the poles sequentially in uniform phase increments. The interactions of the magnetic fields produced by all four poles combine to produce a composite rotating magnetic field vector that is the vector product of all the fields produced by the poles.

FIGS. 5 and 6 illustrate such a polyphase relationship between the poles. At phase "A" a composite magnetic field vector V (illustrated by the center and large arrow of three arrows), which is the vector product of the magnetic field vectors produced by P1 and P2 (illustrated by the two smaller arrows on either side of V) is in line with poles P1 and P2 and pointing toward P1. At phase "B" the composite magnetic field vector V is in line with poles P3 and P4 and pointing toward P4. At phase "C" the composite magnetic field vector is again in line with poles P1 and P2 but now pointing toward P2. At phase "D" the composite magnetic field vector is again in line with poles P3 and P4 but is now pointing toward P3. Thus in this example the composite magnetic field vector is rotating clockwise.

It is well known that a charged particle in a magnetic field experiences a force only if the particle has a component of velocity at right angles to the field's lines of force, and that if the initial velocity vector of a charged particle in a uniform magnetic field is not perpendicular nor parallel to the field's lines of force, the particle will move in a helix pattern. As the stream flows unimpeded through the rotating magnetic field, all or a substantial portion of the charged particles in the stream are imparted with velocity components generally normal to the direction of flow and the particles are influenced to move in respective convoluted paths. The rotating magnetic field assures that charged particles entering a second and subsequent magnetic field that is generally parallel to the general flux of the stream will have velocity vectors that intersect the second field's lines of force at angles, preferably 45°, and therefore will have maximum force exerted on them by the parallel field.

Referring again to FIG. 1, immediately down stream from the means for producing the rotating magnetic field is another electromagnetic device in the form of a solenoid 32 having one or more levels of windings wrapped around the conduit over a length. The solenoid is energized via the secondary of a second transformer generally designated 20 the primary of which is energized by a second alternating electric current source, AC1. The alternating current induced into the secondary is rectified by a rectifier 22 so that the energization of the solenoid is essentially a direct current. When energized the solenoid produces essentially a constant magnetic field having a composite vector along the axis of the conduit with the lines of force in the core of the solenoid being generally parallel to the direction of stream flow. As the charged particles flow past the rotating magnetic field and enter this generally parallel field having velocity components at angles to the lines of force, the charged particles will be compelled to move in a spiral pattern toward the axis of the conduit forming a core sub-stream containing substantially all the charged particles.

Referring again the FIG. 1, immediately downstream from the solenoid is an outlet 24 centered in the conduit having a diameter large enough for the sub-stream to pass through to a drain 26. The outlet and drain remove that portion of the effluent containing the focused concentrations of ions. Salt equals approximately 3.5% of the volume of the seawater. For example, in an installation processing 100,000,000 gallons of seawater per day, the salt output would be 3,500,000 gallons per day in the brine in the slurry drain. The brine can be drained or pumped back into the ocean from whence it came, or to any preferred disposal.

Downstream from the outlet 24 is an outlet baffle 26 which is identical in form to the inlet baffle, except that the size and distribution of the holes is different. The outlet baffle is designed to assure that the stream level is maintained in at an adequate level the conduit. Holes 28 in the bottom or lower portion of the disc are smaller and fewer in number than the holes in 12 the inlet baffle; holes 30 in the top portion of outlet baffle are much larger. The combined holes in the outlet baffle are capable of passing the stream at full capacity.

If the stream level drops, the outlet baffle will provide impedance to flow until the stream level in the conduit rises to a satisfactory level. A minor decrease in water level will not affect the separation process. If a drastic drop in stream pressure and stream volume occurs and persists, a conventional pressure valve can be installed to shut down the system for repairs.

It should be noted that while the above discussion concerns a preferred embodiment wherein the means for focusing a substantial portion of the electrically charged particles into a sub-stream is a solenoid, said means can also be an annular permanent magnet structure of comparable field intensity which provides a composite magnetic field vector along the axis of the conduit without departing from objects and scope of this invention.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims.

I claim:

1. A method for removing charged particles from a body of liquid comprising the steps:
   (a) causing the liquid to flow in a stream,
   (b) collimating the stream such that flux lines of the stream are generally parallel to a collimation axis.
   (c) permeating a first length of the collimated stream with a first magnetic field that rotates normal to said collimation axis, the first magnetic field being of sufficient strength to cause a substantial portion of the charged particles in the collimated stream to move in respective convoluted paths generally centered around said collimation axis, and
   (d) permeating a second length of the collimated stream immediately following the first length with a second magnetic field having lines of flux generally parallel to said collimation axis, the second magnetic field being of sufficient strength to cause the convoluting charged particles to move in a generally spiral motion toward said collimation axis of the stream, the second length being sufficient to allow a substantial portion of the spiraling charged particles to enter a sub-stream at a core of the collimated stream before reaching the end of the second length, and
   (e) removing the sub-stream from the stream at a point where the substantial portion of the charged particles are contained in the sub-stream.

2. A device for removing charged particles from a body of liquid comprising:
   (a) means for causing the liquid to flow in a stream,
   (b) means for collimating the stream such that flux lines of the stream are generally parallel to a collimation axis.
   (c) first means for magnetically causing a substantial portion of the charged particles in the stream to move in respective convoluted paths generally about said collimation axis, and
   (d) second means for magnetically causing a substantial portion of the convoluting charged particles to migrate toward said collimation axis to enter a sub-steam along said axis, and
   (e) means down stream from said second means for removing the sub-steam from the stream.

3. The device according to claim 2 wherein the means for magnetically causing a substantial portion of the charged particles in the stream to move in respective convoluted paths comprises: means for permeating a length of the stream with a magnetic field that rotates transverse to said collimation axis, the rotating magnetic field being of sufficient strength to cause a substantial portion of the charged particles in the stream to move in respective convoluted paths about said collimation axis.

4. The device according to claim 3 wherein the means for permeating a length of the stream with the rotating magnetic field comprises means for directing a polyphase alternating electric current through a plurality of electromagnetic poles radially oriented with respect to, and uniformly distributed around, said axis, the alternating current phases being progressively and sequentially distributed to the poles to produce in the stream a composite magnetic field that rotates generally normal to said collimation axis.

5. The device according to claim 2 wherein the means for magnetically causing a substantial portion of the convoluting charged particles to move toward said collimation axis comprises: means for permeating a length of the stream entered by said convoluting charged particles with a magnetic field having lines of force generally parallel to said collimation axis, the magnetic field being of sufficient strength to cause the convoluting charged particles to migrate, generally in a spiral motion, toward said axis, the length of the stream permeated by the magnetic field being sufficient to allow a substantial portion of the migrating charged particles to enter the sub-stream along said axis.

6. The device according to claim 5 wherein the means for permeating a length of the stream entered by said convoluting charged particles with the magnetic field comprises means for directing an electric current through a conducting coil annular to said axis in order to create a magnetic field within the stream that is parallel to said collimation axis.

7. The device according to claim 2 wherein the means for collimating the stream comprises a conduit through which the stream flows and baffle means disposed upstream from the means for magnetically causing a substantial portion of the charged particles in the stream to move in respective convoluted paths.

8. A device for removing charged particles from a body of water comprising:
   (a) means for causing the water to flow in a stream,
   (b) means for collimating the stream such that flux lines of the stream are generally parallel to a collimation axis,
   (c) first means for permeating a first length of the collimated stream with a first magnetic field that rotates normally about said collimation axis, the first magnetic field being of sufficient strength to cause a substantial portion of the charged particles in the collimated stream to move in respective convoluted paths about said collimation axis, and
   (d) second means for permeating a second length of the collimated stream immediately following the first length with a second magnetic field having lines of force generally parallel to said collimation axis, the second magnetic field being of sufficient strength to cause the convoluting charged particles to migrate, generally in a spiral motion, toward said axis, the second length being sufficient to allow a substantial portion of the migrating charged particles to enter a sub-stream along said axis, and (e) means down stream from said second means for removing the sub-steam from the stream.

9. The device according to claim 8 wherein the means for permeating a first length of the collimated stream with the first magnetic field comprises means for directing a polyphase alternating electric current through a plurality of electromagnetic poles radially oriented with respect to, and uniformly distributed around, said axis, the alternating current phases being progressively and sequentially distributed to the poles to produce in the stream a composite magnetic field that rotates generally normal to said collimation axis.

10. The device according to claim 8 wherein the means for permeating a second length of the collimated stream immediately following the first length with a second magnetic field comprises means for directing an electric current through a conducting coil annular to said axis in order to create a magnetic field within the collimated stream that is parallel to said collimation axis.

11. The device according to claim 8 wherein the means for collimating the stream comprises a conduit through which the stream flows and baffle means disposed upstream from the means for permeating a first length of the collimated stream with a first magnetic field.

12. A device for removing charged particles from a body of water comprising:
(a) means for causing the water to flow in a stream,
(b) means for collimating the stream such that flux lines of the stream are generally parallel to a collimation axis,
(c) first means for permeating a first length of the collimated stream with first magnetic field that rotates normally to said collimation axis, the first magnetic field being of sufficient strength to cause a substantial portion of the charged particles in the collimated stream to move in respective convoluted paths about said collimation axis, and
(d) second means for permeating a second length of the collimated stream immediately following the first length with a second magnetic field having lines of flux generally parallel to said collimation axis, the second magnetic field being of sufficient strength to cause the convoluting charged particles to migrate, generally in a spiral motion, toward said collimation axis, the second length being sufficient to allow a substantial portion of the migrating charged particles to enter a sub-stream along said collimation axis before reaching the end of the second length, and
(e) means down stream from said second means for removing the sub-steam from the stream.

13. The device according to claim 12 wherein the means for permeating a first length of the collimated stream with the first magnetic field comprises means for directing a polyphase alternating electric current through a plurality of electromagnetic poles radially oriented with respect to, and uniformly distributed around, the collimation axis, the alternating current phases being progressively and sequentially distributed to the poles to produce in the stream a composite magnetic field that rotates generally normal to said collimation axis.

14. The device according to claim 12 wherein the means for permeating a second length of the collimated stream immediately following the first length with a second magnetic field comprises means for directing an electric current through a conducting coil annular to the collimation axis in order to create a magnetic field within the collimated stream that is parallel to said collimation axis.

15. The device according to claim 12 wherein the means for collimating the stream comprises a conduit through which the stream flows and baffle means disposed upstream from the means for permeating a first length of the collimated stream with a first magnetic field.

* * * * *